United States Patent [19]

Nishikawa et al.

[11] Patent Number: 4,474,823

[45] Date of Patent: Oct. 2, 1984

[54] METHOD OF FORMING FILLETS

[75] Inventors: Kenjiro Nishikawa, Koganei; Tomizo Kuwazuru; Hiroshi Mizushima, both of Anjoh, all of Japan

[73] Assignee: Nippon Suisan Kaisha, Ltd., Tokyo, Japan

[21] Appl. No.: 379,542

[22] Filed: May 18, 1982

[30] Foreign Application Priority Data

May 19, 1981 [JP] Japan .................................. 56-74187
May 19, 1981 [JP] Japan ............................ 56-71463[U]

[51] Int. Cl.$^3$ ............................................. A22C 25/18
[52] U.S. Cl. .................................... 426/643; 426/513; 426/524
[58] Field of Search ........................ 426/643, 513, 524

[56] References Cited

U.S. PATENT DOCUMENTS

| | | | |
|---|---|---|---|
| 2,938,803 | 5/1960 | Gorton, Jr. ......................... | 426/643 |
| 3,063,842 | 11/1962 | Podebradsky .................. | 426/513 X |
| 3,579,359 | 5/1971 | Schjolberg .......................... | 426/513 |
| 3,728,136 | 4/1973 | Langlands .......................... | 426/513 |
| 3,821,445 | 6/1974 | Okamura et al. ............... | 426/643 X |
| 4,258,068 | 3/1981 | Huffman ........................ | 426/513 X |
| 4,337,275 | 6/1982 | Adams ............................ | 426/513 X |

FOREIGN PATENT DOCUMENTS

| | | | |
|---|---|---|---|
| 1248208 | 9/1971 | United Kingdom ................ | 426/643 |
| 333917 | 9/1970 | U.S.S.R. ............................. | 426/513 |

Primary Examiner—Robert Yoncoskie
Attorney, Agent, or Firm—Sughrue, Mion, Zinn, Macpeak, and Seas

[57] ABSTRACT

A method of processing fish fillets into seafood products is disclosed. Fish fillets can be readily and quickly processed into frozen seafood products having desired shapes. After catching fish and other fishery products, only fillets thereof that are suited for food are converted to frozen blocks aboard ship. The frozen blocks cut into pieces are pressure-formed into a desired shape after they are transported to a processing place on land.

1 Claim, 6 Drawing Figures

METHOD OF FORMING FILLETS

BACKGROUND OF THE INVENTION

Recently, seafood is replacing livestock food in various countries. Particularly in Japan, various methods of processing fish and shellfish have been developed. These methods can be roughly classified into three categories, namely (A) utilizing the fishery products as a frozen meat source, (B) utilizing fish by retaining their shape as much as possible and (C) utilizing fish by breaking them into fine pieces. Method (A) is most popular in Japan. The meat source is this case is prepared by grinding fish meat and then freezing the resultant material in a block having a predetermined shape. From this block "kamaboko" and like kneaded seafoods can be produced. By this type of utility, the taste of fish and shellfish can be preserved. However, only limited kinds of fish and shellfish, mainly white meat fish, can be processed by this method. In addition, a great deal of man-hours are required to process the fishery products into a meat source. Further, the meat source has been developed as kneaded food and can find only limited utility, typically fried foods.

In method (B), only the meat of fishery products, mostly fish, are frozen for preservation, with head, bones and skin removed after catching the fish. The scope of application of this method, however, is limited mainly to large and medium size fish. Method (C) is for processing minced meat and fillets as raw material. In this method, fillets or the like are arranged into a square form and are then integrated by freezing. The method thus can find a wide scope of application to general fish and shellfish, and the processed fishery products may be utilized as material of Western foods as well. The frozen block obtained by this method, however, will be separated into the individual component fillets or meat pieces when it is unfrozen although the components are bound together while the block remains frozen. For this reason, the frozen block products can find little demand in Japan and other countries where exclusive household freezers or refrigerators having a large capacity freezing equipment are not prevalent.

Another drawback in method (C) is that fillets or like material must be packed in an accurate square shape in order to facilitate subsequent processing. Usually, the material is closely packed in a square frame made of a dimple carton or the like having recesses on the surface for integration by freezing.

This will be described in more detail. A square or rectangular frame structure is placed on a base board. A sheet having a number of recesses is then laid on the inner surface of the frame. Fillets or like material are then closely arranged on the sheet and integrated by freezing. The frame is then removed to obtain a frozen block of fillets or like material.

In this case, the fillets or like must of course be arranged closely and orderly even along the sides and at the corners of the frame. However, since the fillets are usually substantially triangular in shape, even in a very orderly arrangement they will inevitably contain considerable spaces defined by adjacent ones of them. At any rate, preparation of a neat frozen block is very time-consuming. For this reason, square frozen fillet blocks are presently produced only on a small scale aboard ships despite the fact the fish can be converted into fillets aboard ship immediately after their catch.

In Japan, the fishery products are processed aboard ship mostly by method (B). That is, fish just caught are converted merely to rounds, severed fish with dress severed fish with bones or fillets, which are immediately frozen aboard for transportation. After these half-processed fishery products are brought to a processing place on land, they are unfrozen and converted to boneless and skinless fillets by removing bones and skins as desired. From these fillets square frozen blocks are produced in the manner as described. This means that in the case of method (C) the frozen products once prepared have to be unfrozen and frozen once again. This will lead to great deterioration of the quality. Besides, unnecessary portions of fish, such as bones and skins, must be transported together with the meat aboard the ship. This leads to an increase of the transportation cost, which will be considerable when fishing is carried out on seas far away, e.g., seas off the coast of Africa which is quite remote from shore processing facilities.

SUMMARY OF THE INVENTION

First, according to the invention, boneless and skinless fish fillets are frozen to obtain a frozen block, which is then processed in a predetermined manner. To form the frozen fillet block, the fillets or the like may be arranged randomly and disorderly without regard to their orientation and hence to the formation of considerable spaces defined by adjacent fillets or the like in the arrangement. The operation efficiency thus can be greatly improved, and the processing can be carried out very simply even aboard ship. Thus, unnecessary portions of fishery may be discarded immediately after their catch to save the transportation cost.

Secondly, the method of processing fish fillets according to the invention comprises two stages, i.e., first processing the fillets or the like into a frozen block and then compressing the block into any desired shape. The component fillets in the resultant shaped product are thus held very closely stuck to one another and will not be separated, for instance when the shaped seafood is unfrozen in frying oil. The fried food will, thus, have the same appearance and taste as boneless fish steak that is obtained by cutting a large size fish.

Thirdly, the frozen block formed prepared in the first stage of the process according to the invention may contain some inner spaces. Also, it need not have a neat square or rectangular shape but may be chipped at corners or have recesses. Further, since the fillets or the like may be arranged without taking substantial care about their orientation and location for the formation of the frozen block, this stage can be completed in a very short period of time. The process is, thus, applicable to general fishery products including boneless and skinless fillets of medium and small size fish as well as large size ones. The frozen block may be cut, if desired, to a desired size before shaping by compression. By so doing, it is possible to obtain shaped frozen seafoods having desired shapes such as those of sliced fish meat, a petal, a plant, etc. Besides, the component meat pieces in the shaped food can be so tightly joined together that the compressed shaped seafood cannot be discriminated as such by the visual inspection. When the compressed shaped seafood thus obtained has an elongate shape having a desired sectional profile, it may be sliced to a desired thickness to obtain a food which has the appearance of an ordinary fish meat steak.

DESCRIPTION OF THE PREFERRED EMBODIMENT

Figure 1:
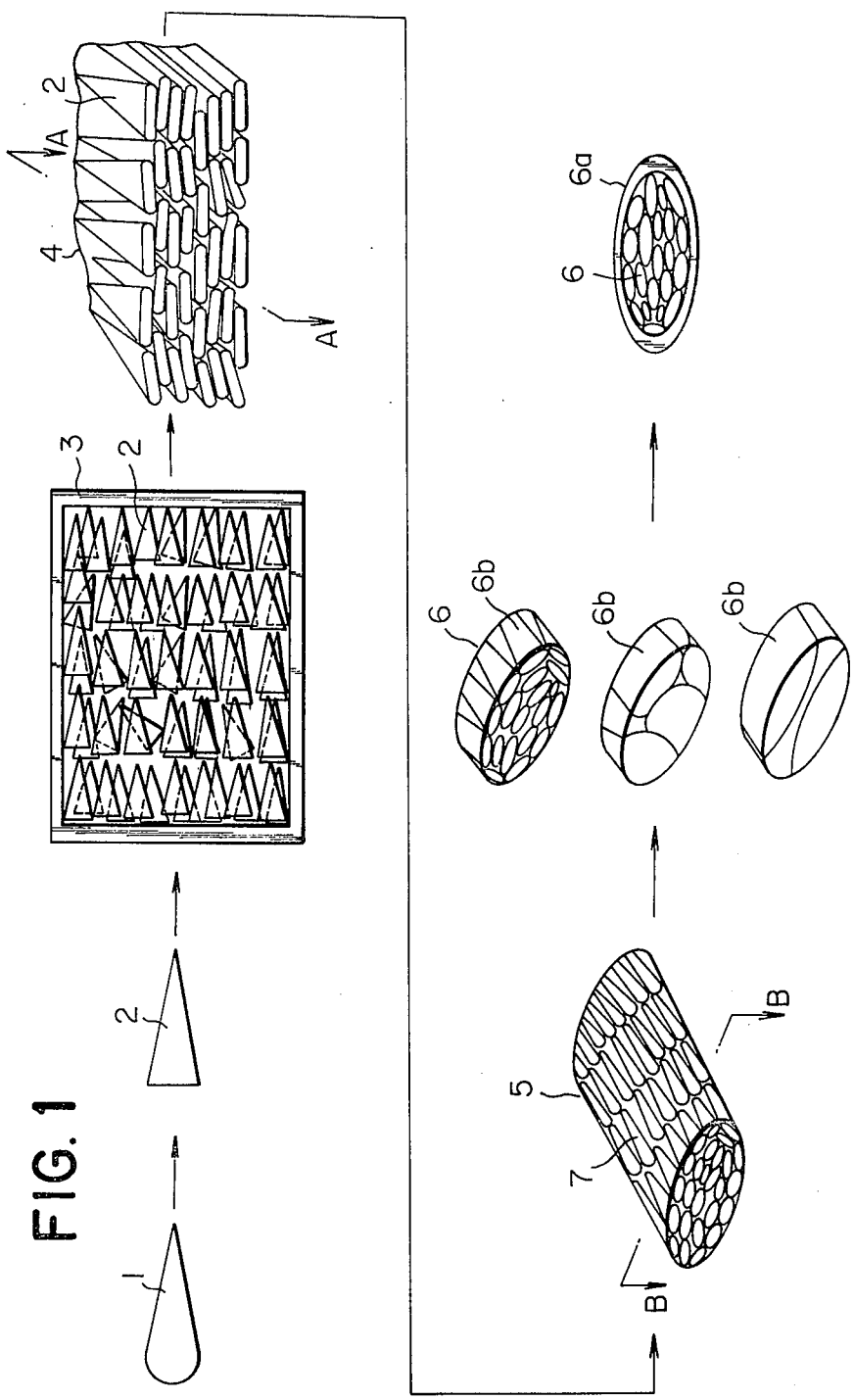
FIG. 1 illustrates a flow sheet showing the flow of the method of processing fish fillets or the like according to the invention.

Referring to FIG. 1, reference numeral 1 designates a fishery product, e.g., a fish. The fish 1 is separated aboard ship into its head, bones and meat portions. The meat portions are collected as fillets 2. The fish may be frozen in the conventional manner instead of processing aboard the ship in the manner as described. In this case, the frozen fishery product is of course unfrozen and the bones and skin are removed to prepare boneless and skinless fillets in a processing place on land. It is preferred, however, to process the fish into boneless skinless fillets immediately after catch.

The fillets 2 thus prepared are then randomly put, without regard to their orientation and location, into a disk-like vessel 3. The fillets 2 have a triangular shape tapering toward the tail end in correspondence to the shape of the original fish. Even with such a shape, the fillets 2 may be arranged randomly and disorderly without regard to their orientation or without consideration to fill even the corners of the vessel 3.

Even if the fillets are heaped up in the middle portion of the vessel 3 so that spaces 2a are formed between their pile and the inner wall surfaces of the vessel 3, it does not matter, and the purpose of the processing according to the invention can be attained.

Figure 2A:
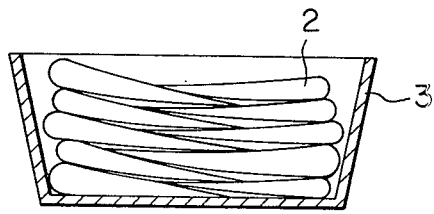
FIGS. 2a and 2b are sectional views illustrating examples of the process of freezing fillets in a vessel shown in FIG. 1.
Figure 2B:
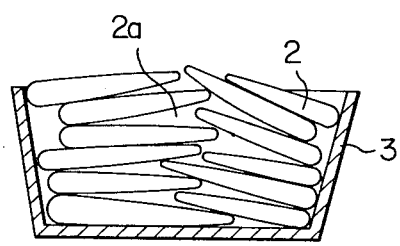

FIG. 2a shows a pile of fillets 2 in a vessel 3. In this arrangement, spaces 2a are formed between the pile of fillets 2 and inner wall surfaces of the vessel 3, and also a number of spaces 2a are formed between adjacent ones of the piled fillets 2. Such a manner of piling fillets 2 gives rise to no problems because a frozen block obtained from the pile is subsequently compression shaped. FIG. 2b shows another example of the pile of fillets 2, in which the fillets 2 are heaped up in the middle of the vessel 3. This pile again gives rise to no problem.

The process of piling fillets 2 using the vessel 3 and then freezing the piled fillets to obtain a frozen block, is a preparatory process for the subsequent compression shaping, and it does not require considerations of the attachment of the individual fillets to one another.

The fillets 2 may be piled up while scattering a binder over one layer of fillets after another. The binder used may be of any conventional type.

The fillets 2 piled up in the vessel 3 are then frozen together into a frozen block 4. This frozen block 4 is the form of a lump or mass of fillets 2. The integration of the fillets 2 at this time will be sufficiently even to such an extent that the lump will be separated into the individual fillets 2 when it is unfrozen. The frozen block 4 thus prepared may then be cut by means of a band saw, for instance along line A—A, to a desired size. If the frozen block prepared has a size suitable for the subsequent compression shaping, it need not be cut into sections.

The frozen block 4 or a section thereof is then compression shaped using a predetermined press. At the time of the formation of the frozen block, the fillets are urged against the vessel while they are being frozen using a contact freezer. In the compression shaping process, the frozen block or its section is further pressurized for compression. Since at this time the fillets bound together are further pressurized in the frozen integrated state, a considerable pressure can be applied for compression without the possibility of spoiling the meat quality of the fillets. Particularly, the spaces 2a that remain in the frozen block will be reduced or eliminated by compression. At any rate, the spaces 2a will serve to alleviate the pressure applied and permit reinforcement of the integration of the fillets more satisfactorily. The pressure applied for compression is determined in relation to the quality of the fish meat. Any pressure may be applied so long as it will not spoil the meat quality. In the case of Alaska pollack, for example, as high a pressure as 50 to 150 kg/cm$^2$ as gauge pressure may be applied under a temperature condition of $-8°$ to $-20°$ C. The pressure may be applied two- or three-dimensionally. The shape, into which the frozen block or a section thereof is compressed, is usually determined in relation to a subsequent cutting step. It may be fish-like, pedal-like, oval, square, etc. in case when the compression shaped frozen seafood is cut into the form of a sliced meat. Further it is possible to obtain an elongate compression shaped frozen seafood having a desired sectional profile. Such an elongate compression shaped frozen seafood 5 may be sliced along line B—B to readily obtain a steak-shaped seafood 6 having a desired shape. Reference numeral 7 designates component fillets in the compression shaped frozen seafood 5.

Such food 6 may be coated with flour-made batter and then with flour, the resultant coating being designated at 6a. The dressed seafood thus obtained is frozen and marketed as material for fried fish. Alternatively, the steak-shaped frozen seafood 6 may be directly packed in the frozen state to be provided as a novel type of seafood.

Since the steak-shaped seafood 6 consists of a mass of small pieces 6b of fish fillets integrated together by compression, it has the original taste of fish provided by the fillet pieces 6d. Also, since it is prepared immediately after the catch of fish and its component fillet pieces are bound together so tight that the seams between adjacent fillet pieces are hardly recognizable by observation. It can retain a sufficiently fresh taste of fish and can hardly be discriminated from such. Further, since it may have a fish-like shape, it may be substantially the same in quality and appearance as nonprocessed fishery product.

Aside from the fillets of fish, the meat of lobsters, crabs, krill, etc. may similarly be processed into seafood having desired shapes. Again in this case, the frozen block may be obtained in any shape provided the frozen blocks are integral masses.

Figure 3A:
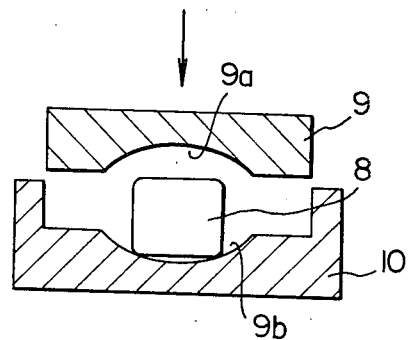
FIGS. 3a to 3c are elevational sectional views and a perspective view, respectively, illustrating the process of compression shaping a block section shown in FIG. 1.
Figure 3B:
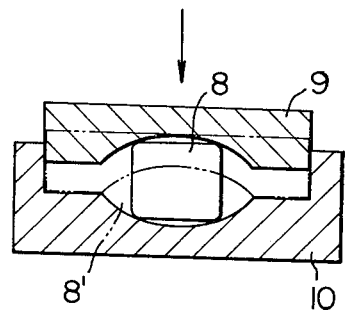
Figure 3C:
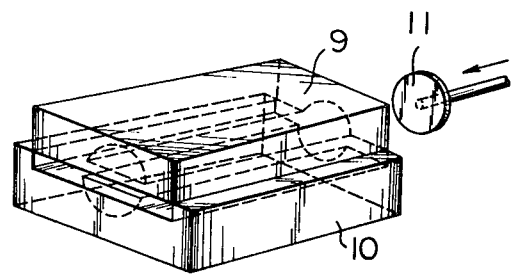

When krill is dealt with for processing, its meat is extracted by peeling away the shells and then frozen as a lump in a vessel and the frozen block thus obtained is compression shaped into a desired shape. When the frozen block is a large lump it may cut into sections before the compression shaping process. When a frozen block is cut into sections and then compression shaped, preferably a rectangular section is obtained and compression shaped using a press in a manner as shown in FIGS. 3a to 3c.

In the Figures, reference numeral 8 designates a frozen block section. The section 8 is set between upper and lower dies 9 and 10. Usually, the lower die 10 is stationary, and the upper die 9 can be vertically moved. Both the dies 9 and 10 have respective recesses or cavities 9a and 10a facing each other. When the upper die 9 is lowered from its position shown in FIG. 3a, the section is pressurized. As it is pressurized, section 8 is spread in the space defined by cavities 9a and 10b. After the compression is completed, the compression shaped frozen seafood 5 thus obtained is pushed out in its longitudinal direction by a push-out member 11 as shown in FIG. 3c. In the compression shaping process as described, the rectangular frozen block section 8 set between the upper and lower dies 9 and 10 first experiences pressure at its corners, and the pressure is progressively transmitted from its corners to the rest of it to effectuate compression. At this time, inner spaces 2a of the section 8 are substantially perfectly eliminated and the component meat pieces are so closely bound together that the section is transformed into a desired shape and the seam between adjacent meat pieces cannot be recognized by visual inspection.

Examples of the invention will be given below.

EXAMPLE 1

10 kg boneless skinless fillets obtained from Alaska pollack by removing the head, guts, bones and skins, were arranged in a freezing pan frame and then frozen to obtain a frozen block. The temperature of the block measured by taking out the block from the pan frame was $-12°$ C. The block is uniformly trisected in its longitudinal direction. One of the sections was set in a mold having a shape like a fish meat slice and a sectional area of 45 cm, and a gauge pressure of 120 kg/cm was applied to it from above and below and also from ahead and behind for 40 seconds. As a result, a compression shaped frozen seafood having a sectional profile like a fish meat slice could be obtained. It was then sliced parallel to its section to a thickness of 1 cm. The sliced pieces of seafood were then dressed with butter and flour to obtain frying material with one piece thereof weighing 60 g.

When the material was fried, it had the same taste as the ordinary fry of fish. When the fry thus prepared was served to 50 persons, none of them could notice it as such.

EXAMPLE 2

Two 14-g frozen blocks of krill meat were prepared aboard a ship operating in the Antarctic Ocean. There were packed in carton cases and brought back to a home factory. The temperature of the blocks when they were each uniformly divided into four sections was $-18°$ C. One of the sections was set in a rectangular mold having a sectional area of 75 cm$^2$, and a gauge pressure of 100 kg/cm$^2$ was applied to it from above and below and also from ahead and behind for 30 seconds, thus obtaining a compression shaped frozen sea food having a rectangular sectional profile.

In a sample testing party, 50 persons recognized its delicious taste similar to that of the lobster.

Thus, according to the invention, fillets of fish or the like are randomly piled in a vessel and frozen together into a block without regard to the shape thereof, which block or a section thereof obtained by cutting it if desired is then compression shaped into a desired shape. Thus, the fillets or the like can be speedily and readily compression formed into a desired shape.

Since the fillets or the like are integrated by freezing into a block without regard to the shape thereof, the operation can be carried out aboard ship immediately after the catching of fish without requiring substantial man-hours but simply and quickly. The frozen block is compression shaped into a desired shape without need of defreezing it in any land place, so that the component fillets in the frozen block need not be bound together. In addition, it need not be unfrozen and frozen once again as in the prior art processing. Further, it is possible to save costs of transportation because unnecessary portions of the fishery products need not be brought back. Moreover, it is possible to sufficiently preserve the meat quality of the compression shaped frozen seafood, and the compression shaping process does not substantially lead to deterioration of the quality of the compressed meat because it is carried out while the meat is in the frozen state.

We claim:

1. A method for processing fish fillets comprising the steps of; arranging fish fillets randomly in a container, under such conditions that spaces are formed between said fillets and inner wall surface of said container and also that a number of spaces are formed between adjacent fillets;

freezing the arranged fillets into a frozen block;

cutting said frozen block into individual pieces and pressure-forming each of said pieces into an elongate shape, in which the fillets are bound in the frozen integrated state and said spaces between adjacent fillets are eliminated by said pressure-forming.

* * * * *